(12) United States Patent  
Dickenson et al.

(10) Patent No.: US 7,428,770 B2  
(45) Date of Patent: *Sep. 30, 2008

(54) SPRING FASTENER WITH HIGHLY IMPROVED REMOVAL TO INSERTION RATIO

(75) Inventors: Daniel James Dickenson, Arlington Heights, IL (US); Michael Walter Smith, Lake Zurich, IL (US); Lawrence John Conway, Des Plaines, IL (US); Paul Lester Clements, Lake Zurich, IL (US)

(73) Assignee: Termax Corporation, Lake Zurich, IL (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/179,970

(22) Filed: Jul. 12, 2005

(65) Prior Publication Data

US 2005/0246870 A1 Nov. 10, 2005

Related U.S. Application Data

(60) Continuation of application No. 10/692,828, filed on Oct. 24, 2003, which is a continuation-in-part of application No. 10/164,963, filed on Jun. 7, 2002, now Pat. No. 6,718,599, and a continuation-in-part of application No. 10/704,481, filed on Nov. 7, 2003, now Pat. No. 6,868,588, and a division of application No. 10/704,094, filed on Nov. 7, 2003.

(60) Provisional application No. 60/301,364, filed on Jun. 25, 2001, provisional application No. 60/327,814, filed on Oct. 9, 2001, provisional application No. 60/353,515, filed on Feb. 1, 2002.

(51) Int. Cl.  
*F16B 5/12* (2006.01)  
*A44B 21/00* (2006.01)

(52) U.S. Cl. .............................. 24/295; 24/289; 24/293; 24/458; 411/508

(58) Field of Classification Search .................. 24/289, 24/297, 293–295, 458, 517, 662; 411/508–510, 411/913; 52/718.01; 296/201  
See application file for complete search history.

(56) References Cited

U.S. PATENT DOCUMENTS

| | | | |
|---|---|---|---|
| 2,322,656 A | 6/1943 | Murphy | 24/73 |
| 2,329,688 A | 9/1943 | Bedford, Jr. | 189/88 |
| 2,424,757 A | 7/1947 | Klumpp | 174/153 |
| 2,542,883 A | 2/1951 | Tinnerman | 24/259 |
| 2,607,971 A | 8/1952 | Bedford, Jr. | 24/73 |
| 2,825,948 A | 3/1958 | Parkin | 24/73 |
| 3,525,129 A | 8/1970 | Holton | 248/188 |
| 3,673,643 A | 7/1972 | Kindell | 24/73 B |

(Continued)

FOREIGN PATENT DOCUMENTS

CA 496700 10/1953  
DE 2255094 A 5/1973

*Primary Examiner*—Robert J. Sandy  
*Assistant Examiner*—Ruth C Rodriguez

(57) ABSTRACT

A spring fastener, which comprises two engagement springs in opposite sides of the fastener. Each engagement spring has an engagement portion comprising a hindrance portion, which increases considerably the removal to insertion force ratio as compared to such ratio when the engagement portion does not have the hindrance portion, thus permitting very easy insertion into, with considerably more difficult removal of the fastener from the slot of a panel.

12 Claims, 8 Drawing Sheets

U.S. PATENT DOCUMENTS

| | | | |
|---|---|---|---|
| 3,864,789 A | 2/1975 | Leitner | 24/73 MF |
| 4,043,579 A * | 8/1977 | Meyer | 293/143 |
| 4,133,246 A | 1/1979 | Small | 85/80 |
| 4,245,652 A | 1/1981 | Kelly et al. | 128/736 |
| 4,431,355 A | 2/1984 | Junemann | 411/15 |
| 4,595,325 A | 6/1986 | Moran et al. | 411/173 |
| 4,609,170 A | 9/1986 | Schnabl | 248/71 |
| 4,683,622 A | 8/1987 | Oehlke | 24/458 |
| 4,701,984 A | 10/1987 | Wyckoff | 24/297 |
| 4,712,341 A | 12/1987 | Harris, Jr. et al. | 52/208 |
| 4,792,475 A | 12/1988 | Bien | 428/137 |
| 4,865,505 A * | 9/1989 | Okada | 411/512 |
| 4,981,310 A | 1/1991 | Belisaire | 285/162 |
| 5,092,550 A | 3/1992 | Bettini | 248/188 |
| 5,095,592 A | 3/1992 | Doerfling | 24/295 |
| 5,129,768 A | 7/1992 | Hoyle et al. | 411/182 |
| 5,367,751 A | 11/1994 | DeWitt | 24/295 |
| 5,373,611 A | 12/1994 | Murata | 24/297 |
| 5,403,034 A * | 4/1995 | Gans et al. | 280/728.3 |
| 5,422,789 A | 6/1995 | Fisher et al. | 361/719 |
| 5,542,158 A | 8/1996 | Gronau et al. | 24/295 |
| 5,651,562 A * | 7/1997 | Hagen et al. | 280/728.3 |
| 5,795,118 A | 8/1998 | Osada et al. | 411/171 |
| 5,887,319 A | 3/1999 | Smith | 24/293 |
| 5,919,019 A | 7/1999 | Fisher | 411/182 |
| 5,987,714 A | 11/1999 | Smith | 24/295 |
| 5,992,914 A | 11/1999 | Gotoh et al. | 296/39.1 |
| 6,074,150 A | 6/2000 | Shinozaki et al. | 411/508 |
| 6,101,686 A | 8/2000 | Velthoven et al. | 24/295 |
| 6,141,837 A | 11/2000 | Wisniewski | 24/295 |
| 6,203,240 B1 | 3/2001 | Hironaka et al. | 403/397 |
| 6,279,207 B1 | 8/2001 | Vassiliou | 24/293 |
| 6,341,466 B1 * | 1/2002 | Kehoe et al. | 52/712 |
| 6,353,981 B1 | 3/2002 | Smith | 24/295 |
| 6,381,811 B2 | 5/2002 | Smith et al. | 24/289 |
| 6,527,471 B2 | 3/2003 | Smith et al. | 24/293 |
| 6,629,809 B2 * | 10/2003 | Vassiliou | 411/173 |
| 6,648,542 B2 | 11/2003 | Smith et al. | 24/293 |
| 6,691,380 B2 | 2/2004 | Vassiliou | 24/295 |
| 6,709,210 B2 * | 3/2004 | Lowry et al. | 411/913 |
| 6,718,599 B2 | 4/2004 | Dickinson et al. | 24/295 |
| 6,745,440 B2 | 6/2004 | Vassiliou | 24/295 |
| 6,840,727 B1 * | 1/2005 | Vassiliou | 411/173 |
| 6,846,125 B2 | 1/2005 | Smith et al. | 24/293 |
| 6,868,588 B2 | 3/2005 | Dickinson et al. | 24/295 |

* cited by examiner

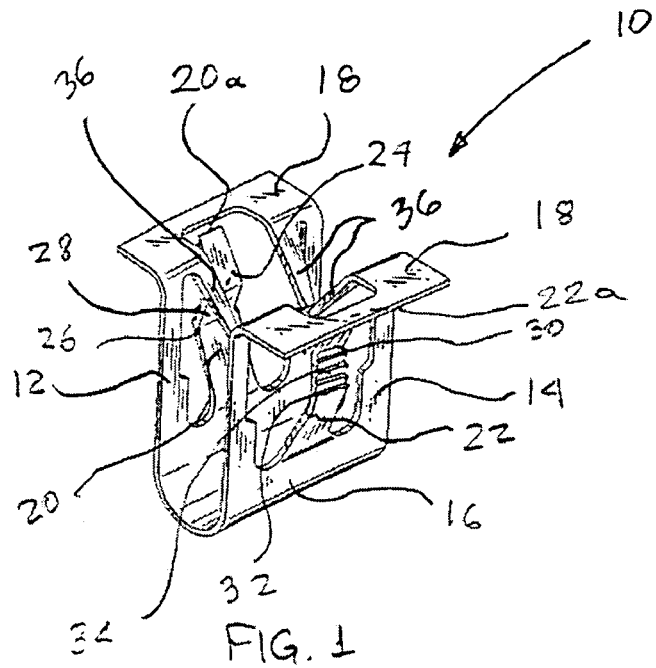
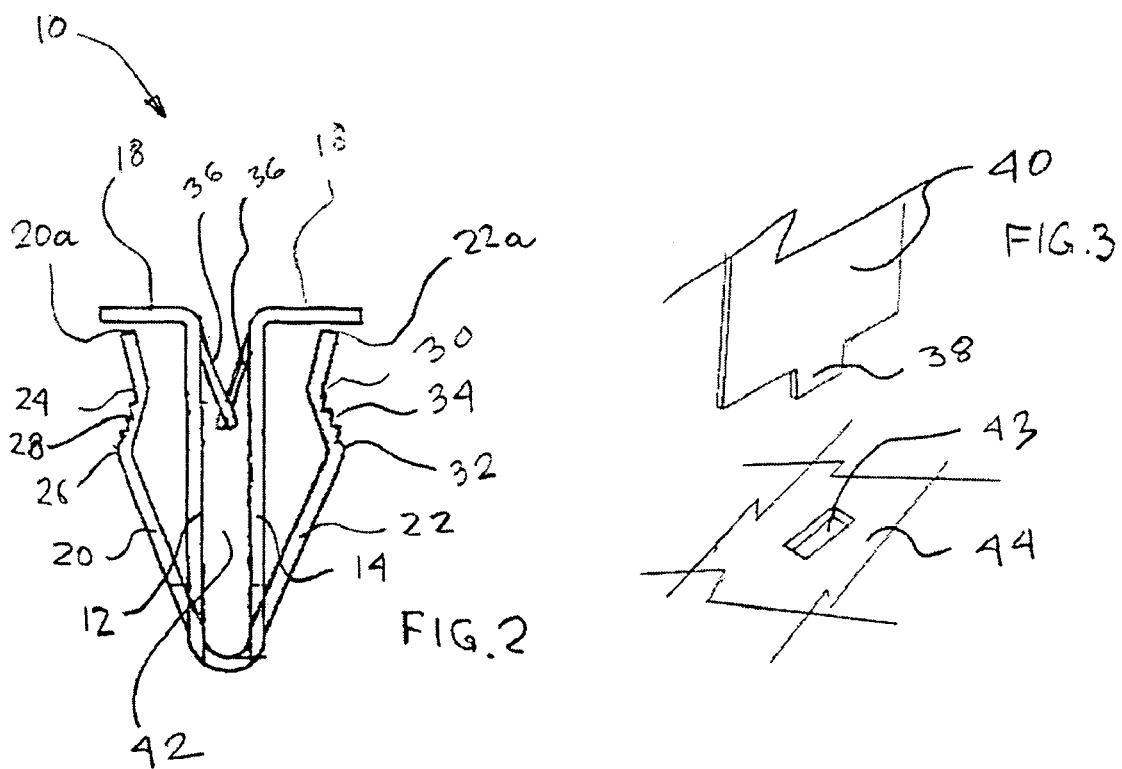

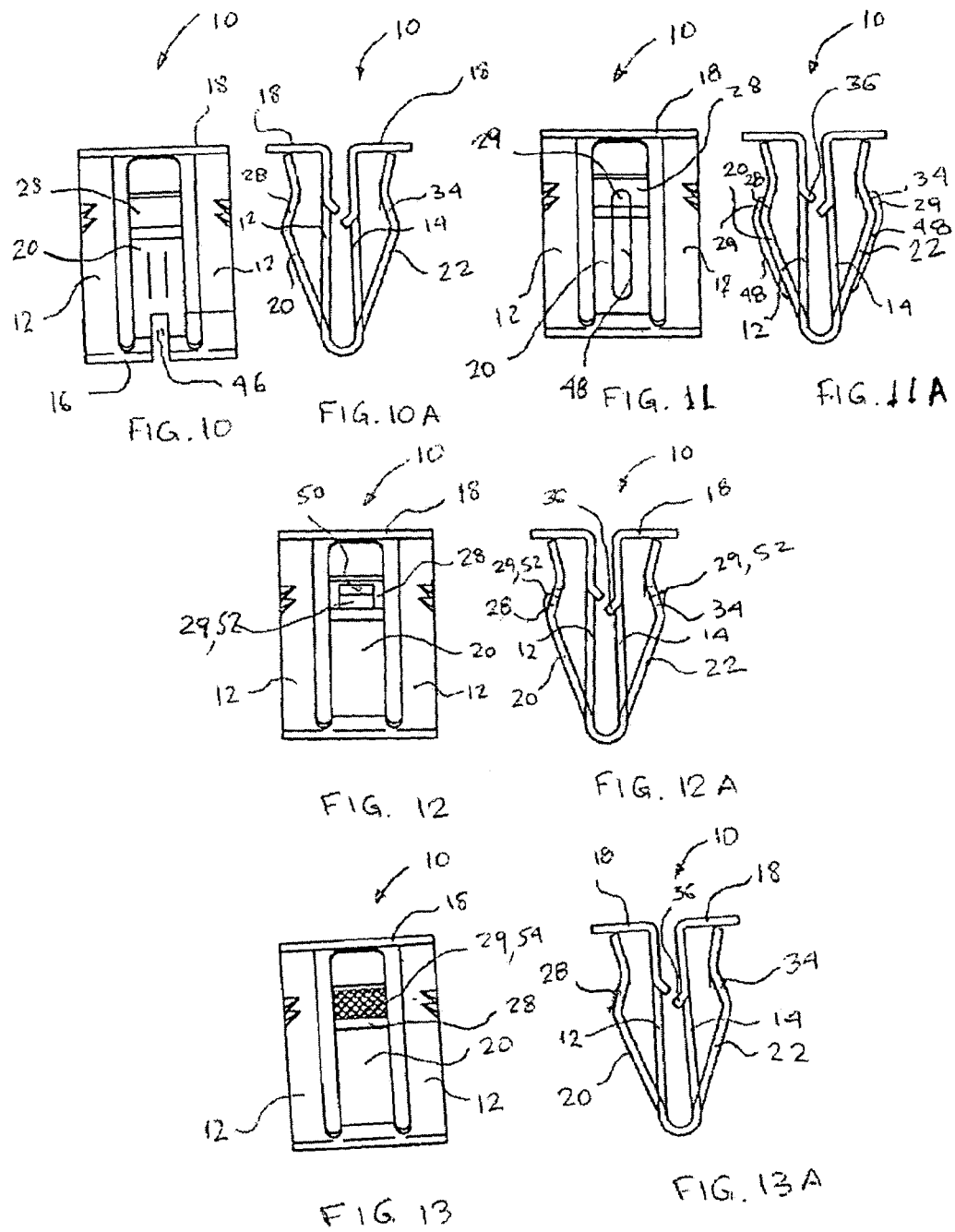

SPRING FASTENER WITH HIGHLY IMPROVED REMOVAL TO INSERTION RATIO

RELATED APPLICATIONS

This application is a continuation of non-provisional application Ser. No. 10/692,828, filed on Oct. 24, 2003, which is a continuation in part of non-provisional application Ser. No. 10/164,963, filed Jun. 7, 2002, now U.S. Pat. No. 6,718,599, and a continuation in part of application Ser. No. 10/704,418 filed Nov. 7, 2003, U.S. Pat. No. 6,868,588, and Divisional application Ser. No. 10/704,094, filed Nov. 7, 2003, all of which are based on priority of provisional patent application 60/301,364, filed Jun. 25, 2001, 60/327,814, filed Oct. 9, 2001, and 60/353,515, filed Feb. 1, 2002. All of the above are incorporated herein by reference in their entirety.

FIELD OF THE INVENTION

This invention relates to spring fasteners, and more particularly to those fasteners which are suitable to be engaged reversibly in a slot (can be inserted and extracted from the slot) of a solid sheet and support a panel through an extension of the panel.

BACKGROUND OF THE INVENTION

A number of fasteners have been used in the past for securing one object on another object, as for example, securing an article such as for example a plastic sheet on a metal or other rigid plastic sheet. However, the fasteners of the type, which are improved by the advances of the present invention, and being used presently, have a rather low ratio of insertion force to removal force. In other words, they require considerable force to be inserted into a slot in order to provide adequate removal resistance in order to be removed from the slot.

Examples of conventional fasteners are disclosed in U.S. Pat. No. 5,987,714 (Smith); U.S. Pat. No. 5,887,319 (Smith); U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi); U.S. Pat. No. 5,095,592 (Doerfling); U.S. Pat. No. 4,792,475 (Bien); U.S. Pat. No. 4,683,622 (Ohelke); U.S. Pat. No. 4,609,170 (Schnabl); U.S. Pat. No. 4,245,652 (Kelly et al.); U.S. Pat. No. 3,864,789 (Leitner); U.S. Pat. No. 3,673,643 (Kindell); U.S. Pat. No. 3,525,129 (Holton); U.S. Pat. No. 2,825,948 (Parkin); U.S. Pat. No. 2,607,971 (Bedford, Jr.); U.S. Pat. No. 2,542,883 (Tinnerman); U.S. Pat. No. 2,329,688 (Bedford, Jr.); U.S. Pat. No. 2,322,656 (Murphy), among others.

U.S. Pat. No. 5,919,019 (Fisher) provides fasteners which can only be permanently installed into a slot; they can only be inserted but not extracted. The major engagement is performed by spring strips, while frictional portions of the fastener pass through the slot with at most slight compression, and immediately after the insertion of the fastener they are located in slightly spaced or barely contacting relation with the edges of the slot. They are only activated for engagement after the insertion of a bolt into a hole at the base plate. Thus, the profound effect of the increased removal to insertion ratio (explained in detail hereinbelow) is not recognized, mentioned, or implied. Thus, the intentionally provided distance of the frictional portions away from the edges of the slot by Fisher, during insertion and before use of the bolt, teaches actually away from the instant invention, which recognizes and takes full advantage of the increased removal to insertion ratio by an engagement portion having a hindrance portion.

As a matter of fact, if the engagement surfaces of the instant invention were located in slightly spaced or barely contacting relation with the edges of the slot, no engagement at all would take place upon insertion of the fastener of this invention into the slot.

SUMMARY OF THE INVENTION

According to one embodiment, a fastener comprises a first side, a second side opposite the first side, a first engagement spring and a second engagement spring. The first side is connected to the second side thereby forming a U-shaped structure having a cavity between the first side and the second side. The fastener further comprises a bottom portion where the first side and the second side are connected. The first engagement spring is connected to the first side in the vicinity of the bottom portion. The second engagement spring is connected to the second side in the vicinity of the bottom portion. At least one of the engagement springs comprises an engagement region with a hindrance portion. The hindrance portion may be at least a partially elongated rib, an upward solid bent extension, a ripple, a knurled region, and any combination thereof According to another embodiment, the spring fastener comprises a first side and a second side opposite the first side, the first side connected to the second side thereby forming a U-shaped structure having a bottom portion and a top portion, the first side comprising a first engagement spring connected to the first side in the vicinity of the bottom portion, the second side comprising a second engagement spring connected the second side in the vicinity of the bottom portion, each of the first and second engagement springs having a free end in the vicinity of the top portion, each spring also comprising a peak, and an engagement region with a hindrance portion between the free end and the peak, the hindrance portion providing increased removal to insertion force ratio, and wherein the fastener can be extracted from any slot into which slot the fastener can be inserted.

This invention also relates to a vehicle comprising two parts connected with a spring fastener, the one part having an extension fitting into a cavity of the fastener, and the other part having a rectangular or square slot suitable to accept the fastener, the spring fastener comprising a first side and a second side opposite the first side, the first side connected to the second side thereby forming a U-shaped structure having a bottom portion and a top portion, the first side comprising a first engagement spring connected the first side in the vicinity of the bottom portion, the second side comprising a second engagement spring connected the second side in the vicinity of the bottom portion, each of the first and second engagement springs having a free end in the vicinity of the top portion, each spring also comprising a peak, and an engagement region with a hindrance portion between the free end and the peak, the hindrance portion providing increased removal to insertion force ratio, and wherein the fastener can be extracted from any slot into which slot the fastener can be inserted.

DESCRIPTION OF THE DRAWINGS

The reader's understanding of practical implementation of preferred embodiments of the invention will be enhanced by reference to the following detailed description taken in conjunction with perusal of the drawing figures, wherein:

FIG. 1 illustrates a perspective view of a sealing spring fastener according to an embodiment of the present invention, wherein the hindrance portion comprises crating or ripples.

FIG. 2 shows a side view of the fastener of FIG. 1

FIG. 3 illustrates two panels, which can be connected with the fastener of FIGS. 1 and 2.

FIG. 10 illustrates a front view of a fastener according to another embodiment of the instant invention, which fastener comprises a relief notch, which provides easier insertion of the spring fastener into a slot.

FIG. 10A illustrates a side view of the fastener of FIG. 10.

FIG. 11 illustrates a front view of a fastener according to still another embodiment of the instant invention, which fastener comprises a rib at least within the engagement region providing a hindrance portion.

FIG. 11A illustrates a side view of the fastener of FIG. 11.

FIG. 12 illustrates a front view of a fastener according to still another embodiment of the instant invention, which fastener comprises an opening with an upward solid bent extension in the engagement region, which provides a hindrance portion.

FIG. 12A illustrates a side view of the fastener of FIG. 12.

FIG. 13 illustrates a front view of a fastener according to still another embodiment of the instant invention, which fastener comprises a knurled region as the hindrance portion.

FIG. 13A illustrates a side view of the fastener of FIG. 13.

FIG. 16 illustrated a fragmental view of another preferred embodiment of the instant invention, which relates a preferable distance between the front point of a barb and the first side, with the thickness of the material that the fastener is made from.

DETAILED DESCRIPTION OF THE INVENTION

Figure 4:
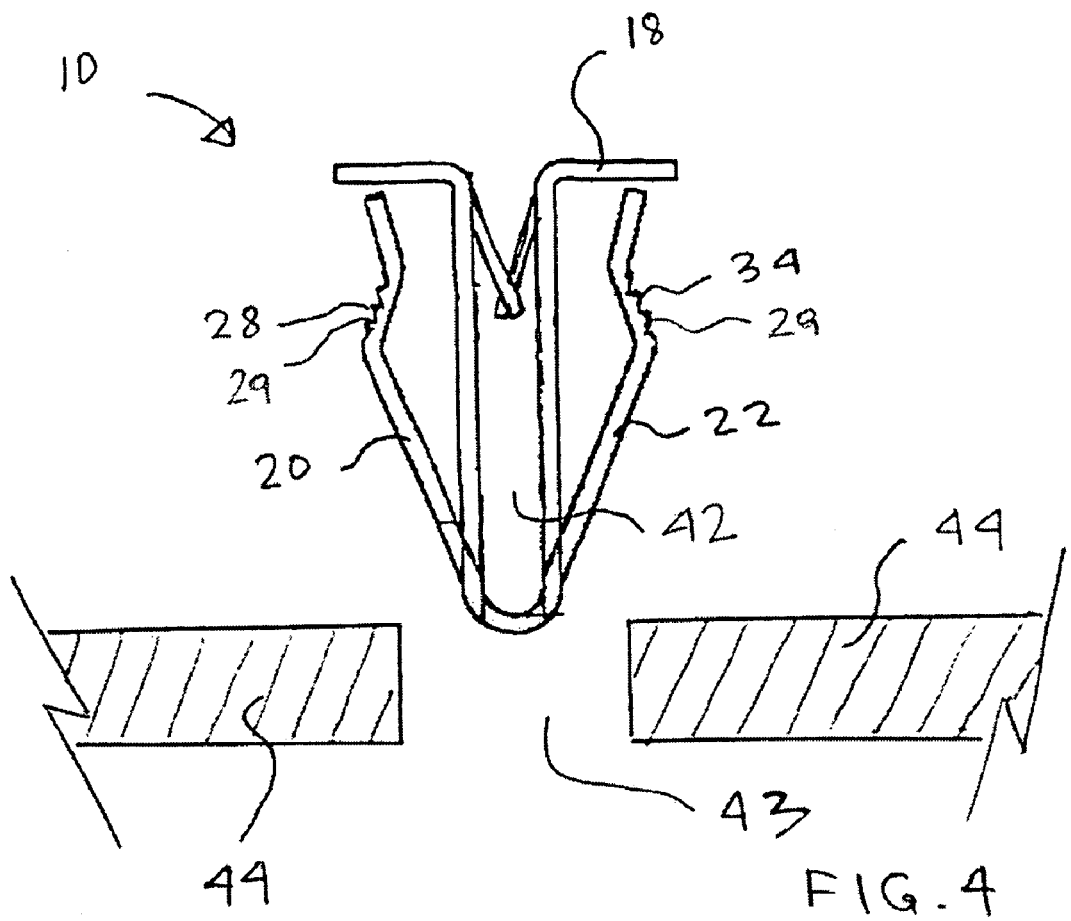
FIG. 4 illustrates the side view of the fastener of FIG. 1 and a cross section of a panel, in a slot of which panel the fastener may be inserted.

As aforementioned, this invention relates to spring fasteners characterized by a structure suitable to be engaged in a slot and secure one article on another article.

More specifically, as better shown in FIGS. 1 and 2, this invention relates to a spring fastener 10, which comprises a first side 12 and a second side 14 opposite the first side 12. The first side 12 is connected to the second side 14, thereby forming the fastener 10 having a U-shaped structure.

The U-shaped structure has a bottom portion 16, where the two portions 12 and 14 join, and a top portion 18. The first side 12 comprises a first engagement spring 20 connected to the first side 12 in the vicinity of the bottom portion 16. The second side comprises a second engagement spring 22 connected the second side 14, also in the vicinity of the bottom portion 16.

Each one of the first and second engagement springs, 20 and 22, has a free end 20a and 22a, respectively, in the vicinity of the top portion 18. The first engagement spring 20 may comprise the first end 20a, a first recess 24, a first peak 26, and a first engagement region 28 shown, according to this embodiment, between the optional first recess 24 and the first peak 26. According to one embodiment, the first engagement region includes a hindrance portion 29 in this case comprising crating or ripples. Similarly, the second engagement spring 22 may comprise a second free end 22a, an optional second recess 30, a second peak 32, and a second engagement region 34 shown, according to this embodiment, between the second recess 30 and the second peak 32. According to one embodiment, the second engagement region 34 includes a hindrance portion 29 in this case comprising a crating or ripples. The presence of the recesses 24 and 30 is preferable, but not necessary. In the absence of recesses 24 and 30, the free ends 20a and 22a assume the location of said recesses 24 and 30. Crating or ripples are structures comprising one or more linear impressions or scores preferably substantially parallel to each other, as for example shown in FIGS. 8 and 9, wherein only one crating or ripple (in the form of impression or score) is present.

The hindrance portion 29 may be along the whole engagement regions 28 and 34, respectively, or along part of them, preferably closer the peaks 26 and 32.

It is required by the instant invention that the hindrance portions 29 have to provide increased removal to insertion force ratio, and at the same time allow the fastener to be extracted from any slot into which slot the fastener can be inserted.

The fastener 10 may also be provided with barbs 36, the function of which is to secure the extension 38 of a panel 40 (FIG. 3) into the cavity 42 (FIG. 2) of the fastener 10. The barbs 36 may be preferably designed in a manner to promote easy insertion of the extension 38 into the cavity 42, but more difficult extraction. Such barbs 36 are elongate curved barbs close to their front points pointing inwardly, as better illustrated in FIGS. 14A, 15A, and 17, and also disclosed in U.S. Pat. Nos. 6,279,207 B1 and 6,691,380 B2, both of which are incorporated herein by reference.

The length of the regions of the first and/or the second engagement springs 20 and 22, respectively, between the respective optional recesses and free ends, can vary from zero to such a length that will not interfere with the top end 18 of the fastener in operation. In such an occasion the recesses become free ends. However, most preferably, these regions have a definite length higher than zero.

In operation of this embodiment, the fastener 10 is inserted into a slot 43 of a panel 44, before or after the extension 38 of panel 40 has been inserted into the cavity 42 of the fastener 10.

Figure 5:
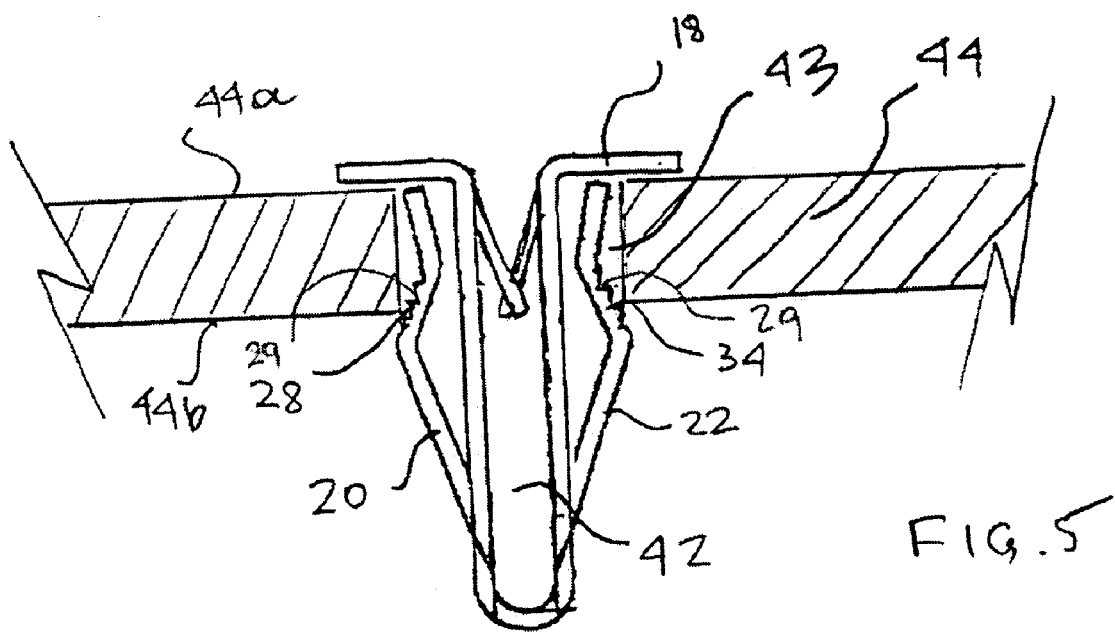
FIG. 5 illustrates the same elements shown in FIG. 4 after insertion of the fastener into the slot of the panel.

As better illustrated in FIG. 4, the fastener 10 with the engagement springs 20 and 22 in an expanded form is over the slot 43 of the panel 44. In FIG. 5, the fastener is shown after it has been inserted into the slot 43 of the panel 44. At this position, the fastener is secured at the top portion 18 by the upper side 44a of the panel 44, and at the engagement portions 28 and 34 by the lower side 44b, at the point where the lower side 44b intersects with the slot 43. In this position of the fastener 10, the engagement springs 20 and 22 are compressed toward each other as shown in FIG. 5. In this particular case, illustrated in FIGS. 4 and 5, the hindrance portion covers the whole engagement region.

Figure 7:
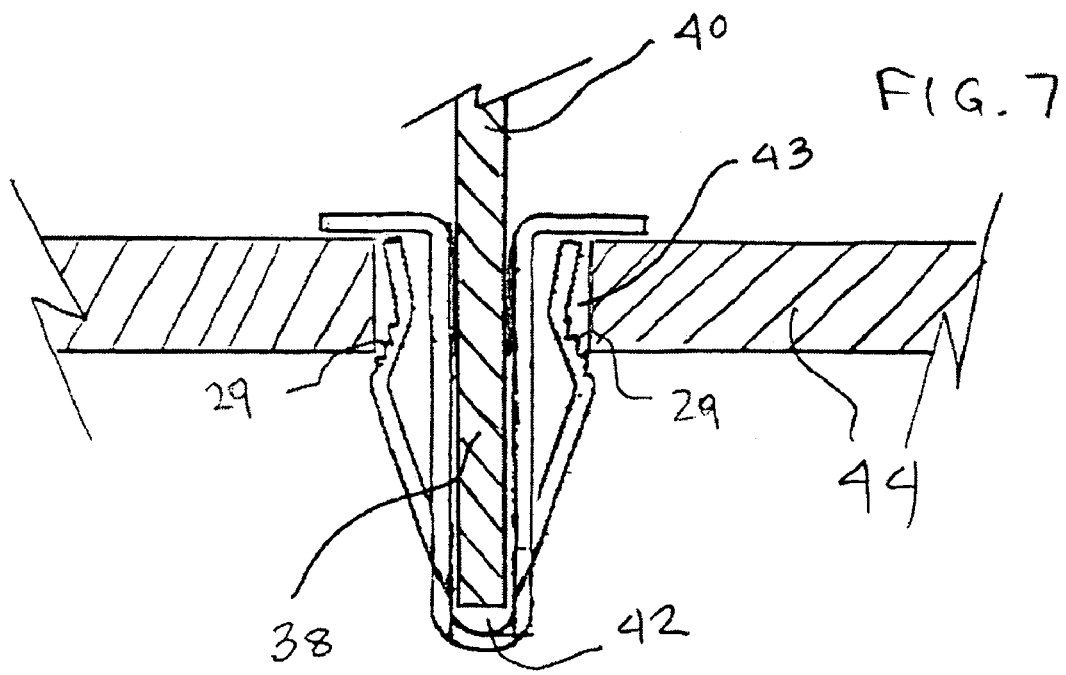
FIG. 7 illustrates the same elements shown in FIG. 6 after insertion of the fastener into the slot of the panel containing the slot.

In sequence, the extension 38 of the panel 40 is inserted into the cavity 42 of the panel 40, thereby connecting panel 40 with panel 44 through the spring fastener 10, which has already been inserted into the slot 43 of panel 44, as better shown in FIG. 7.

Figure 6:
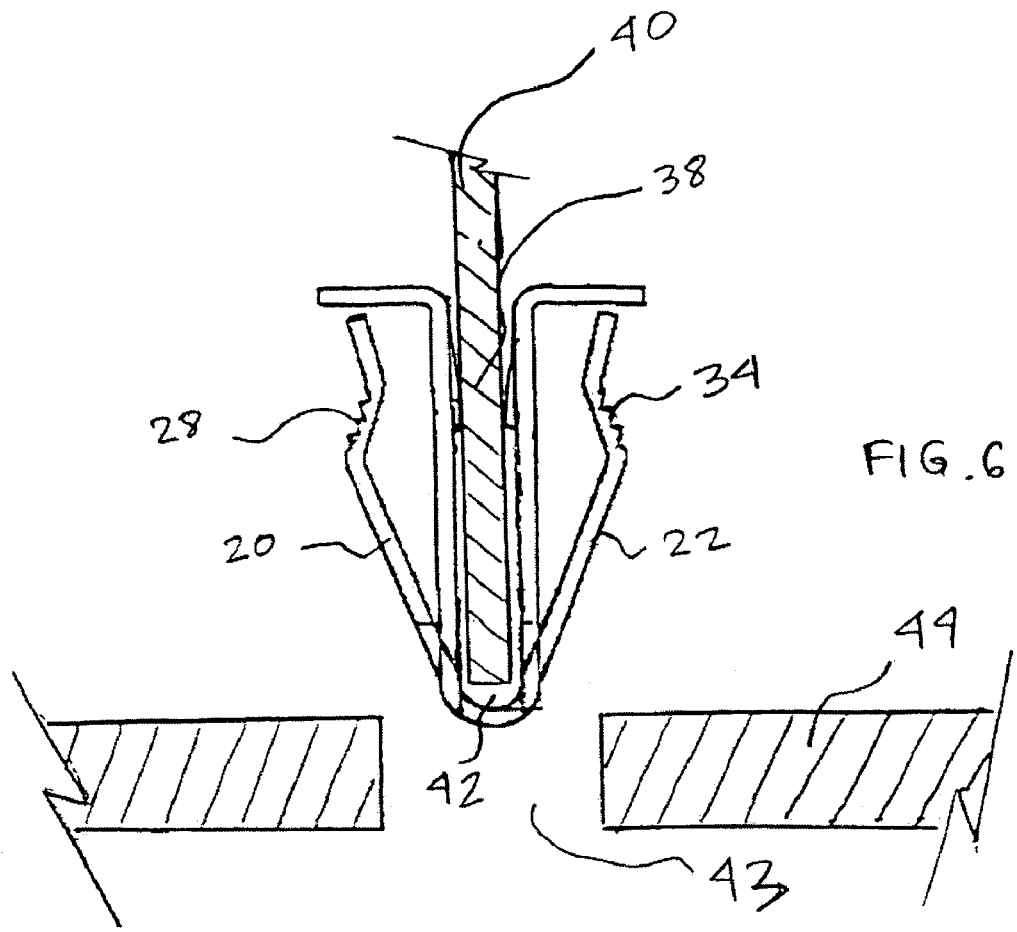
FIG. 6 illustrates the same elements shown in FIG. 4 after insertion of another panel into the cavity of the fastener.

In addition, the extension 38 may be first inserted into the cavity 42 of the fastener 10, as better shown in FIG. 6, and then this assembly secured into the slot 43 of panel 44, as also shown in FIG. 7.

It is very important to note that the force required to insert the fastener 10 into the slot 44 is slightly higher, if at all higher, than the force that would be required to insert the fastener 10 into the slot 44 if the engagement portions were lacking the hindrance portion 29.

In contrast, the force to remove the fastener 10 from the slot 44 is considerably higher than the force that would be required to remove the fastener 10 from the slot 44 if the engagement portions were smooth (in the absence of hindrance portion 29).

This unexpected finding of major increase of the removal to insertion force ratio (force required to remove the fastener divided by the force required to insert the fastener) by use of hindrance portion 29, allows a person of ordinary skill in the art to design fasteners of this type requiring minimal insertion force but considerable removal force, which is a great advance in the art. A person of ordinary skill in the art would certainly expect to find equal increase in insertion and removal of the fattener by the use of hindrance portion 29, which would give no benefit at all to the ratio.

As aforementioned, U.S. Pat. No. 5,919,019 (Fisher) provides fasteners which can only be permanently installed into a slot; they can only be inserted but not extracted without destruction of the fastener. The major engagement is performed by locking strips (see column 2, lines 38-43), while frictional portions of the fastener pass through the slot with at most slight compression, and immediately after the insertion of the fastener they are located in slightly spaced or barely contacting relation with the edges of the slot (see column 3, lines 29-40). They are only activated for engagement after the insertion of a bolt into a hole at the base plate (see column 3, lines 41-48). Thus, the profound effect of the increased removal to insertion ratio, as explained hereinabove is not recognized, mentioned, or implied. Further, the intentionally provided distance of the frictional portions away from the edges of the slot by Fisher, during insertion and before use of the bolt, teaches actually away from the instant invention, which recognizes and takes full advantage of the increased removal to insertion ratio by an engagement portion having hindrance portion 29.

As a matter of fact, if the grated engagement surfaces of the instant invention were located in slightly spaced or barely contacting relation with the edges of the slot, no engagement at all would take place upon insertion of the fastener of this invention into the slot.

Figure 8:
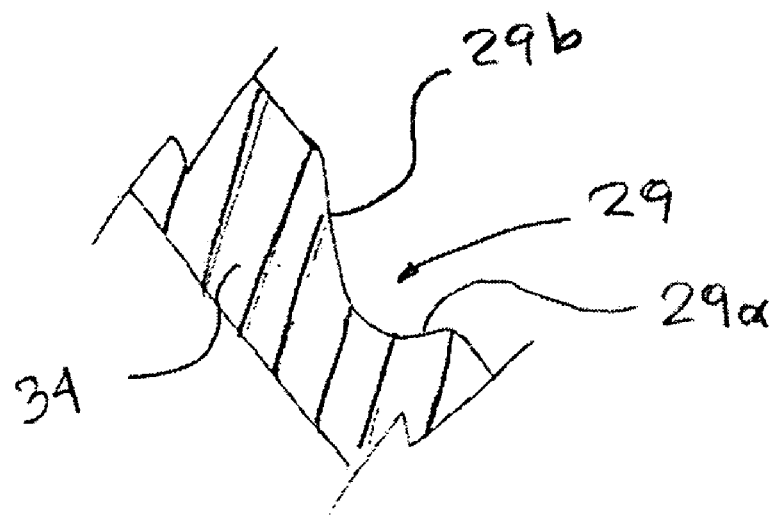
FIG. 8 illustrates an engaging portion having a crating according to another embodiment of the present invention.
Figure 9:
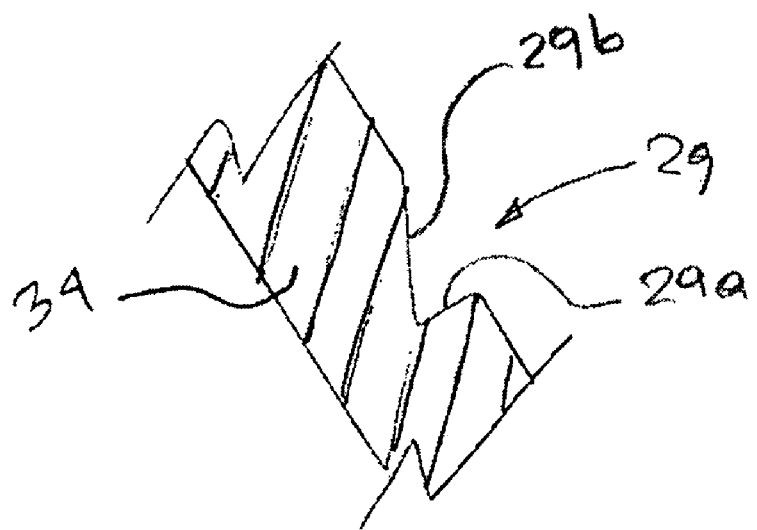
FIG. 9 illustrates an engaging portion having a crating according to still another embodiment of the present invention.

In order to further increase the removal to insertion ratio, the hindrance portion 29 may be preferentially oriented as a ripple to favor easier movement in the way of insertion than in the way of removal of the fastener as better shown in FIGS. 8 and 9. It is highly preferable that the back side 29*a* of the hindrance portion 29 (FIG. 8) has a gradual curvature, and that the front side 29*b* extends as much as possible, preferably along the whole length of the engagement portion 34 (shown as a partial extension with a gradual inclination in FIG. 8)

In another embodiment of the instant invention, better shown in FIGS. 10 and 10A, there is a relief notch 46 at the bottom portion 16 of the fastener 10, which notch 46 facilitates the springiness of the engagement springs 20 and 22, resulting in easier insertion of the fastener into a respective slot 43 (see FIGS. 3-7), thereby increasing the removal to insertion ratio, which always refers to the removal force of the fastener 10 from the slot 43 as compared to the insertion force of the fastener 10 to the slot 43.

The operation of this embodiment is substantially the same as the operation of the previous embodiments, with the difference that the insertion force is caused by the relief notch 46 to be lower than in the absence of such element.

In another embodiment of the instant invention, better shown in FIGS. 11 and 11A, there is a rib 48, at least on the engagement portion 28 and/or 34, which rib 48 acts as a hindrance portion 29. The hindrance portion 29, which in this case is the rib 48 over the engagement portion 28 and/or 34, increases the removal force of the fastener 10 from the respective slot 43 (see FIGS. 3-7).

Figure 11B:
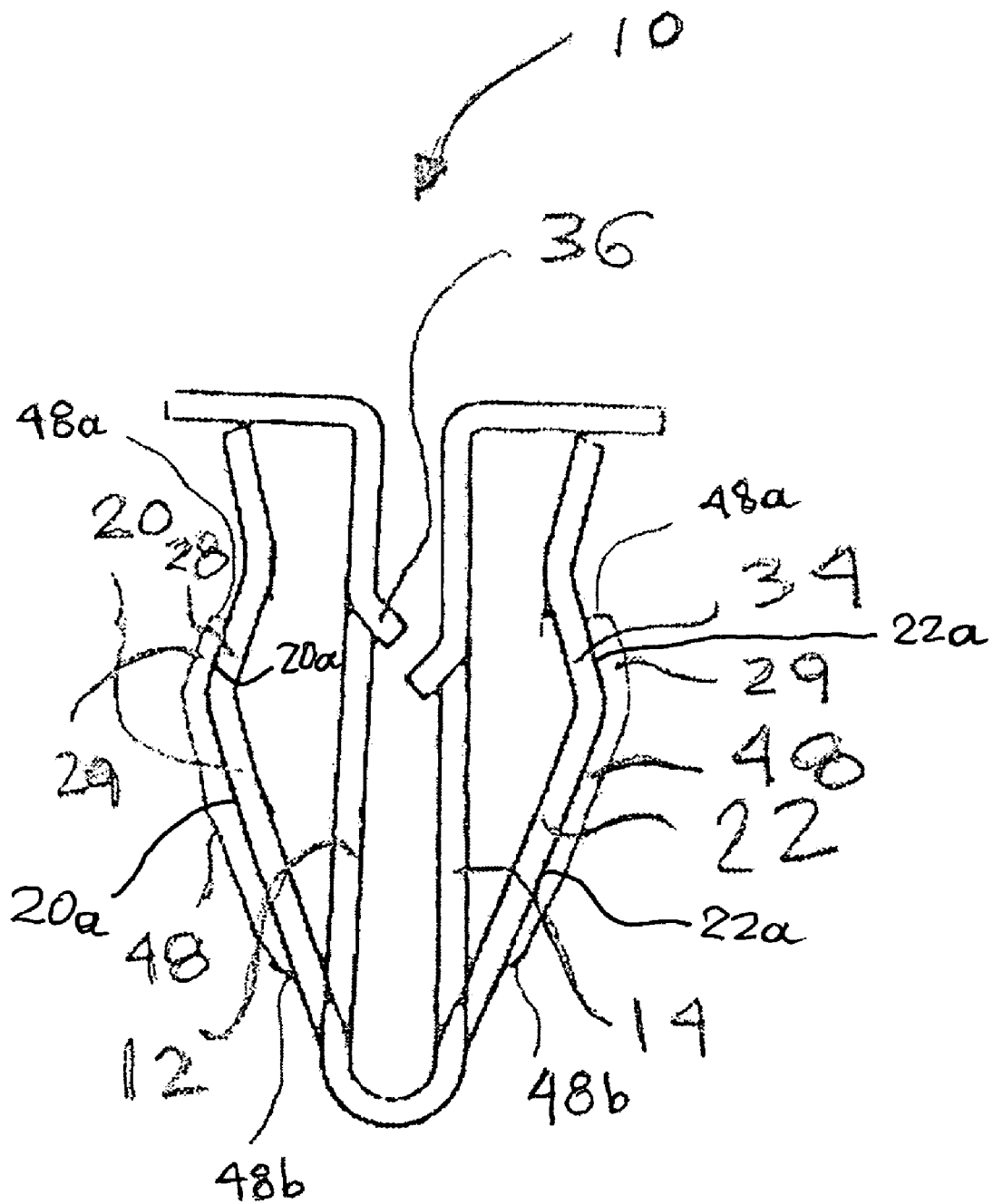
FIG. 11B illustrates the same side view as FIG. 11A, but in a magnified and more detailed fashion.

FIG. 11B is a magnified version of FIG. 11A, which illustrates in more detail the configuration of this embodiment. As shown in FIG. 11B, the hindrance portions 29 are positioned over the engagement portions 28 and 34 in the form of the rib 48. According to one embodiment, the rib 48 is elongated. According to this embodiment the elongated rib 48 is uninterrupted and extends further away from and outside the hindrance portions 29 which are disposed over the engagement portions 28 and 34 of the engagement springs 20 and 22, respectively, which whole engagement springs comprise first and second surfaces 20*a* and 22*a,* respectively.

As further shown in FIG. 11B, the uninterrupted elongated ribs 48 comprise an upper end 48*a* positioned on the engagement region 28 and/or 34 and a lower end 48*b* positioned on the engagement spring 20 and/or 22 outside the engagement region 28 and/or 34, the upper ends 48*a* having an incline with respect to the plane of the surface 20*a* and/or 22*a* of the engagement spring 20 and/or 22, respectively, under it that is different from an incline of the lower end 48*b* with respect to the plane of the surface 20*a* and/or 22*a* of the engagement spring 20 and/or 22, respectively, under it. In this respect, the portion of the uninterrupted rib disposed on the engagement region lacks a lower end, while the portion of the uninterrupted rib disposed on the engagement spring outside the engagement region lacks an upper end.

According to one embodiment, and as well illustrated in FIG. 11B, the incline of the lower end 48*b* is different than the incline of the upper end 48*a* as illustrated in FIG. 11B. For example, the incline of the lower end 48*b* is smaller than the incline of the upper end 48*a*.

The operation of this embodiment is in at least one respect is similar to the operation of the previous embodiments, with at least one difference being that the rib 48 affects the removal force, which provides the hindrance portion 29 over the engagement portion 28 and/or 34, to be higher than in the absence of such element.

In another embodiment of the instant invention, better shown in FIGS. 12 and 12A, there is an opening 50 within the engagement portion 28 and/or 34, accompanied by an upward solid bent 52, which bent 52 acts as a hindrance portion 29. The hindrance portion 29, which in this case is the upward solid bent 52, over the engagement portion 28 and/or 34, increases the removal force of the fastener 10 from the respective slot 43 (see FIGS. 3-7).

The operation of this embodiment is substantially the same as the operation of the previous embodiments, with the difference that the removal force is caused by the upward solid bent 52, over the engagement portion 28 and/or 34, to be higher than in the absence of such element.

In still another embodiment of the instant invention, better shown in FIGS. 13 and 13A, the hindrance portion 29 is a knurled region 54. The hindrance portion 29, which in this case is the knurled region 54, increases the removal force of the fastener 10 from the respective slot 43 (see FIGS. 3-7).

The operation of this embodiment is substantially the same as the operation of the previous embodiments, with the difference that the removal force is caused by the knurled region 54 to be higher than in the absence of such element.

Figure 14:
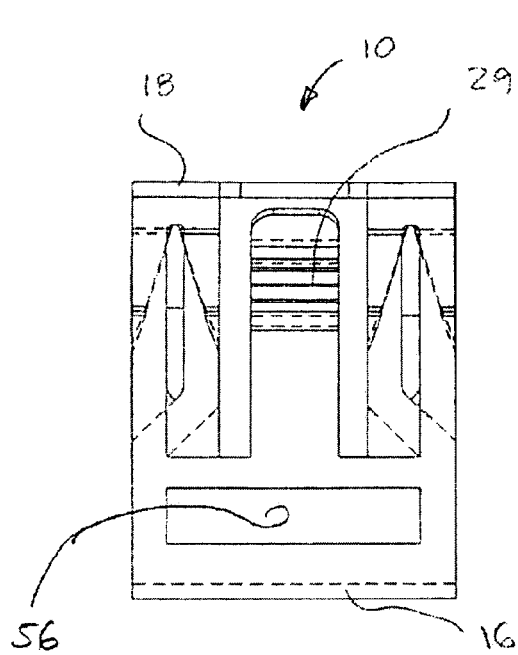
FIG. 14 illustrates a front view of a fastener according to still another embodiment of the instant invention, which fastener comprises a relief opening which helps easier insertion of the fastener into a respective slot.
Figure 14A:
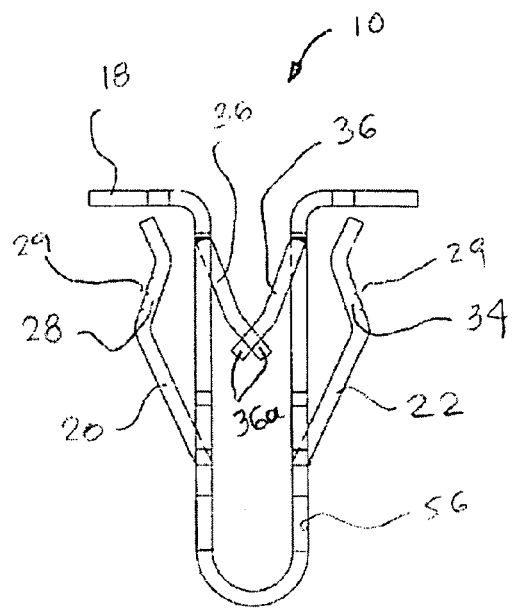
FIG. 14A illustrates a side view of the fastener of FIG. 14.

In another embodiment of the instant invention, better shown in FIGS. 14 and 14A, there is a relief opening 56 in the vicinity the bottom portion 16 of the fastener 10, which relief opening 56 facilitates the springiness of the engagement springs 20 and 22, resulting in easier insertion of the fastener into a respective slot 43 (see FIGS. 3-7), thereby increasing the removal to insertion ratio.

The operation of this embodiment is substantially the same as the operation of the previous embodiments, with the difference that the insertion force is caused by the relief opening 56 to be lower than in the absence of such element.

Figure 15:
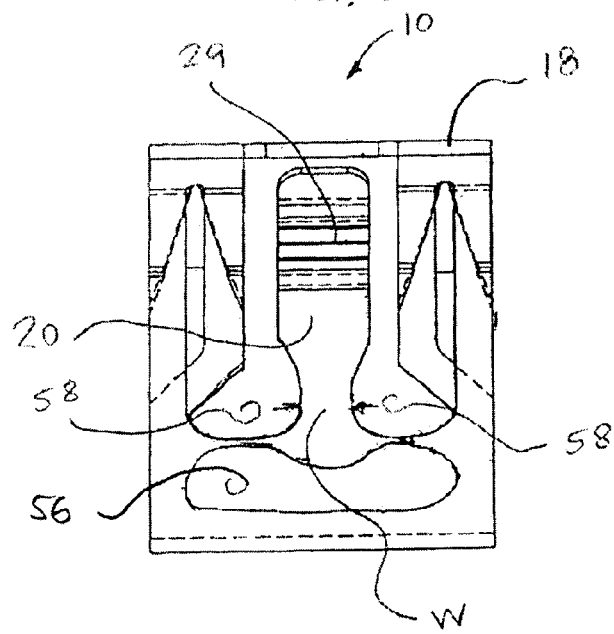
FIG. 15 illustrates a front view of a fastener according to still another embodiment of the instant invention, which fastener comprises a relief opening and undercuts, which help even easier insertion of the fastener into a respective slot.
Figure 15A:
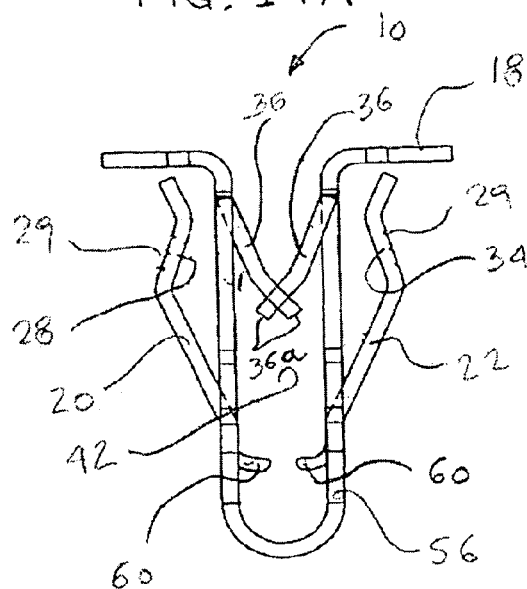
FIG. 15A illustrates a side view of the fastener of FIG. 15, and also illustrates the presence of lower barbs.

In another embodiment of the instant invention, better shown in FIGS. 15 and 15A, there is also a relief opening 56 and undercuts 58 in the vicinity the bottom portion 16 of the fastener 10, which increase even further the springiness of the engagement springs 20 and 22, as compared to the case illustrated in FIGS. 14 and 14A due to the close proximity of the opening 56 to the undercuts 58, and the decreased width W of the engagement springs 20 and 22 by the undercuts 58.

The operation of this embodiment is substantially the same as the operation of the previous embodiments, with the difference that the insertion force is caused by the relief opening 56 and the undercuts 58 to be lower than in the absence of such elements.

It is important to note, as better shown in FIG. 15A that presence of lower barbs 60 causes improved alignment of the extension 38 (FIG. 3) into the cavity 42 of the fastener 10, especially in the case that the thickness of the extension 38 is smaller than the distance between the first side 12 and the second side 14 of the fastener 10.

Figure 16:
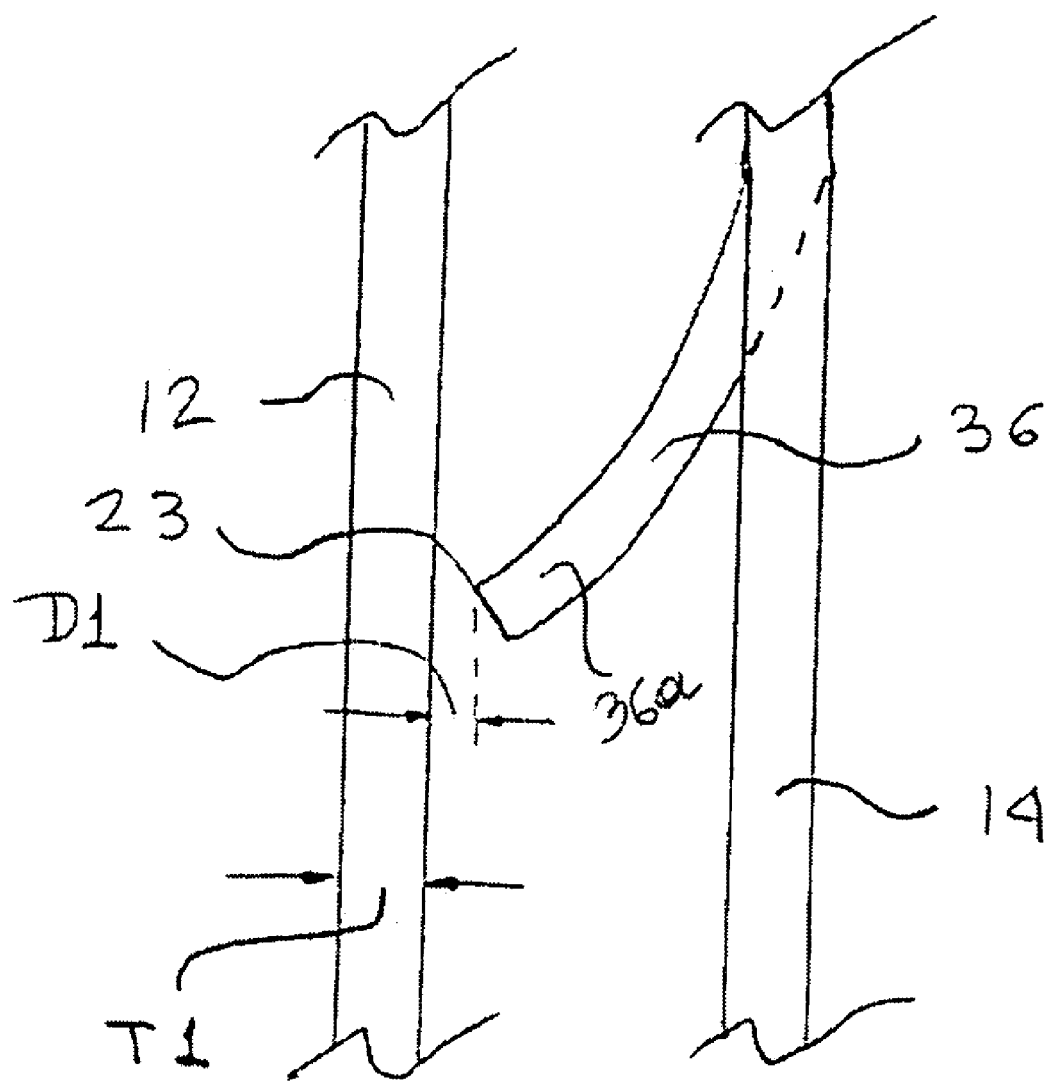

It is further important to note, as shown in FIG. 16, that most preferably, the distance D1 between the front point 23 of the barb 36, which barb 36 originates from the second side 14, and the first side 12 is smaller than the thickness T1 of the material (usually sheet of metal) from which the fastener is made from. The same is true for any other barb, especially for barbs which are closest to the edges of the fastener. Such an arrangement prevents tangling of the fasteners when packaged, especially in bulk.

Barbs with inwardly bent front ends 36a as illustrated in FIGS. 14A, 15A and 16 may be made.

Automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

What is claimed is:

1. A fastener comprising:
   a first side;
   a second side opposite the first side, the first side connected to the second side thereby forming a U-shaped structure having a cavity between the first side and the second side;
   a bottom portion wherein the first side and the second side are connected;
   a first engagement spring having a first surface connected to the first side in the vicinity of the bottom portion;
   a second engagement spring having a second surface connected to the second side in the vicinity of the bottom portion; and
   wherein at least one of the engagement springs comprises an engagement region comprising a hindrance portion, the hindrance portion comprising one structure selected from: ripple, uninterrupted elongated rib on the hindrance portion extending outside said hindrance portion, opening within the hindrance portion, said opening being accompanied by an upward solid bent, and a combination thereof; and
   wherein at least one of the first and second side comprises at least one barb comprising a bent front end with respect to said barb.

2. The fastener of claim 1, wherein the uninterrupted elongated rib is within or extends outside the hindrance portion.

3. The fastener of claim 1, wherein the hindrance portion comprises a structure selected from a ripple, an opening within the hindrance portion, said opening being accompanied by an upward solid bent, and a combination thereof.

4. The fastener of claim 2, wherein the uninterrupted elongated rib comprises an upper end and a lower end, the upper end having an incline with respect to the respective surface of the respective engagement spring under said upper end that is different from an incline of the lower end with respect to the respective surface of the respective engagement spring under said lower end.

5. The fastener of claim 3, wherein the uninterrupted elongated rib is within or extends outside the hindrance portion.

6. The fastener of claim 4, wherein the incline of the upper end is larger than the incline of the lower end.

7. A vehicle comprising parts connected with a fastener, the fastener comprising:
   a first side;
   a second side opposite the first side, the first side connected to the second side thereby forming a U-shaped structure having a cavity between the first side and the second side;
   a bottom portion wherein the first side and the second side are connected;
   a first engagement spring connected to the first side in the vicinity of the bottom portion; and
   a second engagement spring connected to the second side in the vicinity of the bottom portion; and
   wherein at least one of the engagement springs comprises an engagement region comprising a hindrance portion, the hindrance portion comprising one structure selected from ripple, uninterrupted elongated rib on the hindrance portion extending outside said hindrance portion, opening within the hindrance portion, said opening being accompanied by an upward solid bent, and a combination thereof; and
   wherein at least one of the first and second side comprises at least one barb comprising a bent front end with respect to said barb.

8. The vehicle of claim 7, wherein the uninterrupted elongated rib is within or extends outside the hindrance portion.

9. The vehicle of claim 7, wherein the elongated ribs have an upper end and a lower end, the upper end having a slope that is different from a slope of the lower end.

10. The vehicle of claim 7, wherein the uninterrupted elongated rib comprises an upper end and a lower end, the upper end having an incline with respect to a plane containing a surface of the respective engagement spring under said upper end that is different from an incline of the lower end with respect to a plane containing a surface of the respective engagement spring under said lower end.

11. The vehicle of claim 7, wherein the hindrance portion comprises a structure selected from a ripple, an opening within the hindrance portion, said opening being accompanied by an upward solid bent, and a combination thereof.

12. The vehicle of claim 10, wherein the incline of the upper end is larger than the incline of the lower end.

* * * * *